(12) United States Patent
Melz et al.

(10) Patent No.: US 7,971,486 B2
(45) Date of Patent: Jul. 5, 2011

(54) APPARATUS AND METHOD FOR THE VIBROACOUSTIC INSPECTION OF A MOTOR VEHICLES

(75) Inventors: Tobias Melz, Darmstadt (DE); Michael Matthias, Darmstadt (DE); Holger Hanselka, Darmstadt (DE)

(73) Assignee: Fraunhofer-Gesellschaft zur Förderung der Angewandten Forschung E.V., Munich (DE)

( * ) Notice: Subject to any disclaimer, the term of this patent is extended or adjusted under 35 U.S.C. 154(b) by 715 days.

(21) Appl. No.: 11/913,419

(22) PCT Filed: Apr. 27, 2006

(86) PCT No.: PCT/EP2006/003940
§ 371 (c)(1),
(2), (4) Date: May 20, 2008

(87) PCT Pub. No.: WO2006/119874
PCT Pub. Date: Nov. 16, 2006

(65) Prior Publication Data
US 2008/0229836 A1    Sep. 25, 2008

(30) Foreign Application Priority Data

May 12, 2005 (DE) .......................... 10 2005 022 096

(51) Int. Cl.
*G01M 17/00* (2006.01)
*G01M 7/00* (2006.01)
(52) U.S. Cl. ........................ 73/669; 73/11.04; 73/11.07
(58) Field of Classification Search ............... 73/11.04, 73/11.07, 669; 737/117; 3/124
See application file for complete search history.

(56) References Cited

U.S. PATENT DOCUMENTS

| | | | |
|---|---|---|---|
| 3,520,180 A | 7/1970 | Polhemus et al. | |
| 3,914,990 A | 10/1975 | Borg | |
| 5,610,330 A | 3/1997 | Fricke et al. | |
| 5,877,414 A * | 3/1999 | Rui et al. | 73/146 |
| 5,880,362 A * | 3/1999 | Tang et al. | 73/146 |
| 5,942,673 A | 8/1999 | Horiuchi et al. | |
| 6,112,586 A * | 9/2000 | Fricke et al. | 73/146 |
| 6,134,957 A * | 10/2000 | Fricke et al. | 73/146 |
| 6,535,832 B2 * | 3/2003 | Page et al. | 702/141 |
| 7,302,825 B2 * | 12/2007 | Knox | 73/11.04 |
| 7,401,520 B2 * | 7/2008 | Parison | 73/669 |
| 7,461,556 B2 * | 12/2008 | Hamilton | 73/669 |
| 7,628,077 B2 * | 12/2009 | Yu et al. | 73/669 |

FOREIGN PATENT DOCUMENTS

DE       30 40 355 C2    5/1982

(Continued)

*Primary Examiner* — Helen C. Kwok
(74) *Attorney, Agent, or Firm* — Antonelli, Terry, Stout & Kraus, LLP.

(57) ABSTRACT

The invention is an apparatus and a method for carrying out a vibroacoustic inspection of a motor vehicle that features at least a front and a rear axle, with a test stand that is directly or indirectly connected to at least one of the two axles by means of a force flow and relative to which the motor vehicle is tied, wherein at least one vibration generator of a first type is provided along the force flow in order to generate vibrations below 50 Hz. The invention includes at least one second vibration generator of a second type, which is provided along the at least one force flow or parallel to the force flow, for generating vibrations above 30 Hz, preferably above 100 Hz, and the at least one second vibration generator is operatively connected to the motor vehicle.

18 Claims, 3 Drawing Sheets

FOREIGN PATENT DOCUMENTS

| | | |
|---|---|---|
| DE | 37 23 476 A1 | 1/1989 |
| DE | 41 36 508 A1 | 5/1993 |
| DE | 692 29 747 T2 | 11/1995 |
| DE | 101 50 382 A1 | 4/2003 |
| EP | 0 220 794 | 5/1987 |
| EP | 1 494 006 A1 | 1/2005 |

* cited by examiner

APPARATUS AND METHOD FOR THE VIBROACOUSTIC INSPECTION OF A MOTOR VEHICLES

BACKGROUND OF THE INVENTION

1. Field of the Invention

The invention pertains to an apparatus and a method for carrying out a vibroacoustic inspection of a motor vehicle that features at least a front and a rear axle, with a test stand that is directly or indirectly connected to at least one of the two axles by means of a force flow and relative to which the motor vehicle is tied, wherein at least one vibration generator of a first type is provided along the force flow in order to generate vibrations below 50 Hz. The invention furthermore pertains to a method for vibroacoustic inspection of motor vehicles.

2. Description of the Prior Art

Test stands on which a motor vehicle is to be inspected, that are driven on rollers or rolls in a self-propelled fashion, are used for experimentally determining the vibroacoustic behavior of motor vehicles in the laboratory. FIG. 2 schematically shows a known roller-type test stand, in which at least the wheels of the vehicle 1 that are driven by the driving axle are in rolling contact with rollers 2 of the roller-type test stand. A heavy-duty electric motor 3 serves for driving and decelerating (absorbing the load of) the rollers 2, wherein the operating mode of the electric motor is controlled by a control and monitoring unit 4. An at least soundproof (semi-anechoic) measuring chamber, that surrounds the entire test stand, is required for carrying out a vibroacoustic inspection of the motor vehicle situated on the rollers 2 in order to obtain information on driving noises inside and outside the motor vehicle 1 under defined ambient conditions. According to the schematic representation shown in FIG. 2, roller-type test stands of this type are technically complex and therefore very costly, wherein these test stands also require much space. Known roller-type test stands also do not make it possible to realistically simulate the vibroacoustic behavior of a vehicle while driving maneuvers are executed. Another decisive disadvantage is the low flexibility with respect to the driving surfaces that can be simulated, particularly in light of the fact that a change of the road surface requires costly and time-consuming adaptations of the driving rollers and the driven rollers, respectively.

Various concepts that make it possible to subject a vehicle to different loads in the vertical direction of the vehicle, for example, as illustrated in the test stand according to FIG. 3, have been proposed in order to solve the problem of simulating driving maneuvers and different operational loads on a test stand. In this case, the motor vehicle 1 is situated on lifting platform elements that can be vertically raised in a servohydraulic fashion, wherein the two front lifting platform elements of the embodiment shown are equipped with motor-driven continuous bands 2, on which the front wheels driven by the vehicle are positioned. Corresponding electric motors 3 are provided for driving the two separate running bands 2. Although test stands of this type make it possible to introduce specific loads into the motor vehicle 1 along the vertical direction of the vehicle, the problem of a flexible change of the road surface also remains unsolved in this case.

There is an urgent need for an experimental simulation environment that is able to simulate operational loads as well as driving maneuvers and highly dynamic loads as realistically as possible under laboratory conditions, wherein this need is justified by advancing developments in the field of active and, in particular, adaptive chassis components that not only serve for optimizing the driving characteristics with respect to an improved roadability, but also for reducing sounds and vibrations occurring within the motor vehicle and therefore contribute to improving the safety and the comfort. The stimulation of high-frequency vibrations emanating from the vehicle is primarily caused by the rolling contact between the tires and the road surface and is significantly influenced by the tire profile and the road surface quality, wherein these high-frequency vibrations contribute to the overall acoustic properties of the motor vehicle and therefore need to be individually determined and correspondingly analyzed. Although conventional test stands with servohydraulic load application units as, for example, in accordance with the embodiment shown in FIG. 3, make it possible to experimentally simulate nearly all degrees of freedom acting upon the vehicle. Test stands of this type reach their technical limits with respect to the frequency range of the vibrations introduced into the vehicle at approximately 50 Hz.

SUMMARY OF THE INVENTION

The invention pertains to an apparatus for carrying out a vibroacoustic inspection of a motor vehicle that features at least a front and a rear axle, with the apparatus comprising a test stand that is directly or indirectly connected to at least one of the two axles by means of at least one force flow and relative to which the motor vehicle is tied, and with at least one vibration generator of a first type being provided along the force flow in order to generate vibrations below 50 Hz. The invention is based on the objective of realizing this apparatus in such a way that the motor vehicle can be transformed into states of vibration that are simulated as realistically as possible and in which the motor vehicle can be inspected in a sensory fashion and evaluated. The invention aims, in particular, to reduce the set-up work and the technical devices required for determining the vibration behavior of the motor vehicle on different road surfaces and with different tire profiles to a minimum.

The test stand of the invention differs from the prior test stands, in which the tires of the motor vehicle to be inspected are in rolling contact with rollers or running bands provided on the test stand. The invention connects the motor vehicle that is completely tied relative to the test stand to a vibration generator of a second type along at least one drive shaft that usually features means for mounting the wheels on its two opposite ends. This vibration generator of the second type is able to introduce vibrations above 30 Hz, preferably above 100 Hz, into the motor vehicle. Depending on the control of the vibration generator, the motor vehicle therefore can be transformed into a state of high-frequency vibrations that the motor vehicle also assumes if it is actually driven along a road surface.

The advantage of the apparatus of the invention can be seen, in particular, in that the vibrations within the motor vehicle are not generated due to the physical contact between the tire profile and the road surface, but rather realized within the motor vehicle due to its specific coupling to suitably selected vibration generators that are preferably able to generate vibrations in a frequency range between 30 and 500 Hz.

Although it would be possible, in principle, to introduce the vibrations into the motor vehicle at any location of the car body, the most realistic simulation of a real driving situation is achieved by introducing the high-frequency vibrations along at least one driving axle of the motor vehicle, namely in a region on which the tires with the drive shaft are mounted.

In order to transform the motor vehicle that is completely tied to the test stand into a state of vibration that simulates a real driving situation as realistically as possible, it is not only necessary to introduce uniform accelerations and low-frequency alternating loads, in the same fashion as in a current test stand, according to the embodiment shown in FIG. 3, but also to specifically introduce high-frequency vibrations for simulating rolling noises as well as the vibrations caused within the motor vehicle due to the interaction between the road and the tires. As mentioned above with reference to the embodiment shown in FIG. 3, so-called servohydraulic cylinders are particularly suitable for introducing uniform or low-frequency vibrations. These servohydraulic cylinders are able to introduce uniform excursions as well as low-frequency vibrations into the motor vehicles not only along the vertical direction of the vehicle, but also in the direction of the longitudinal and lateral axes of the vehicle. For this purpose, three separate servohydraulic cylinders are respectively provided on the motor vehicle per introduction point as described below with reference to other embodiments.

So-called "electrodynamic shakers" are particularly suitable for specifically introducing high-frequency vibrations into the motor vehicle. Three of these electrodynamic shakers are preferably also provided per introduction point in order to introduce high-frequency vibrations into the vehicle along the vertical direction of the vehicle, the longitudinal direction of the vehicle and the lateral direction of the vehicle.

It was determined that, in principle, two different embodiments are particularly advantageous for introducing high-frequency vibrations into the motor vehicle.

According to a first embodiment, the high-frequency vibrations are introduced parallel to the force flow, along which the uniform loads or low-frequency vibrations are introduced into the motor vehicle. The second embodiment, in contrast, focuses on the integration of a vibration generator of the second type in order to generate high-frequency vibrations along the force flow, in the direction of which the loads or low-frequency vibrations of the respective first vibration generator act upon the motor vehicle. In the latter instance, vibration generators in which converter materials are used as vibration actuators are particularly suitable for introducing the high-frequency vibrations.

Both embodiments are described in detail below with reference to the specific embodiments and make it possible achieving largely realistic vibrations of the entire motor vehicle that is tied to the test stand such that purposeful inspections of the motor vehicle can be carried out with the aid of suitable vibration sensors. For this purpose, a vibration pattern to be realized is recorded in a sensory fashion during a test drive with a test vehicle and serves as a reference vibration pattern, on which the vibroacoustic inspection of a motor vehicle tied to the test stand is based. At least one reference sensor that registers the actual vibrations of the motor vehicle is arranged on or in the motor vehicle to be inspected that is tied to the test stand. An evaluation unit compares the vibrations recorded in a sensory fashion with the reference vibration pattern and generates correction signals for controlling the corresponding vibration generators if deviations are detected. This results in a control circuit that makes it possible to transform the motor vehicle into a realistically simulated state of vibration in accordance with certain reference vibration patterns. Consequently, the invention for the first time makes it possible to transform motor vehicles tied to a test stand into states of vibration that correspond to different driving situations, for example, driving on various road surfaces, driving with different tires and therefore different tire profiles, driving on wet or dry road surfaces, etc. All realistically imaginable driving situations and conditions can be simulated with the test stand according to the invention without the set-up work required for realizing corresponding road surface and tire conditions. The motor vehicle to be inspected is not fitted with any tires when it is connected to the test stand and therefore to the vibration generators that are coupled to the test stand and transforms the motor vehicle into realistically simulated states of vibration.

It goes without saying that the determination of the vibration behavior of the motor vehicle to be inspected by means of externally arranged vibration generators can also be supplemented with the self-propulsion of the vehicle engine. Analogous to known test stands, the vehicle engine is subjected to a load by coupling the drive shaft to corresponding load-absorbing units that are preferably realized in the form of electric motors such that various engine load states of the motor vehicle can be realized. The inventive test stand therefore makes it possible to simulate and analyze comfort-related and acoustics-related driving states on a self-propelled or self-firing motor vehicle that is tied to the test stand with the ultimate objective of making available a developmental environment in a laboratory environment, in which passive and intelligent material and structural systems can be tested for use in the automotive industry. In addition, new control systems and control systems, yet to be developed, can be analyzed in such an experimental simulated environment, wherein the latter option can neither be sensibly nor effectively realized in the real driving mode.

BRIEF DESCRIPTION OF THE INVENTION

Exemplary embodiments of the invention are described below with reference to the figures, namely without restricting the general object of the invention to these embodiments. The figures show:

DESCRIPTION OF THE PREFERRED EMBODIMENTS

Figure 1:
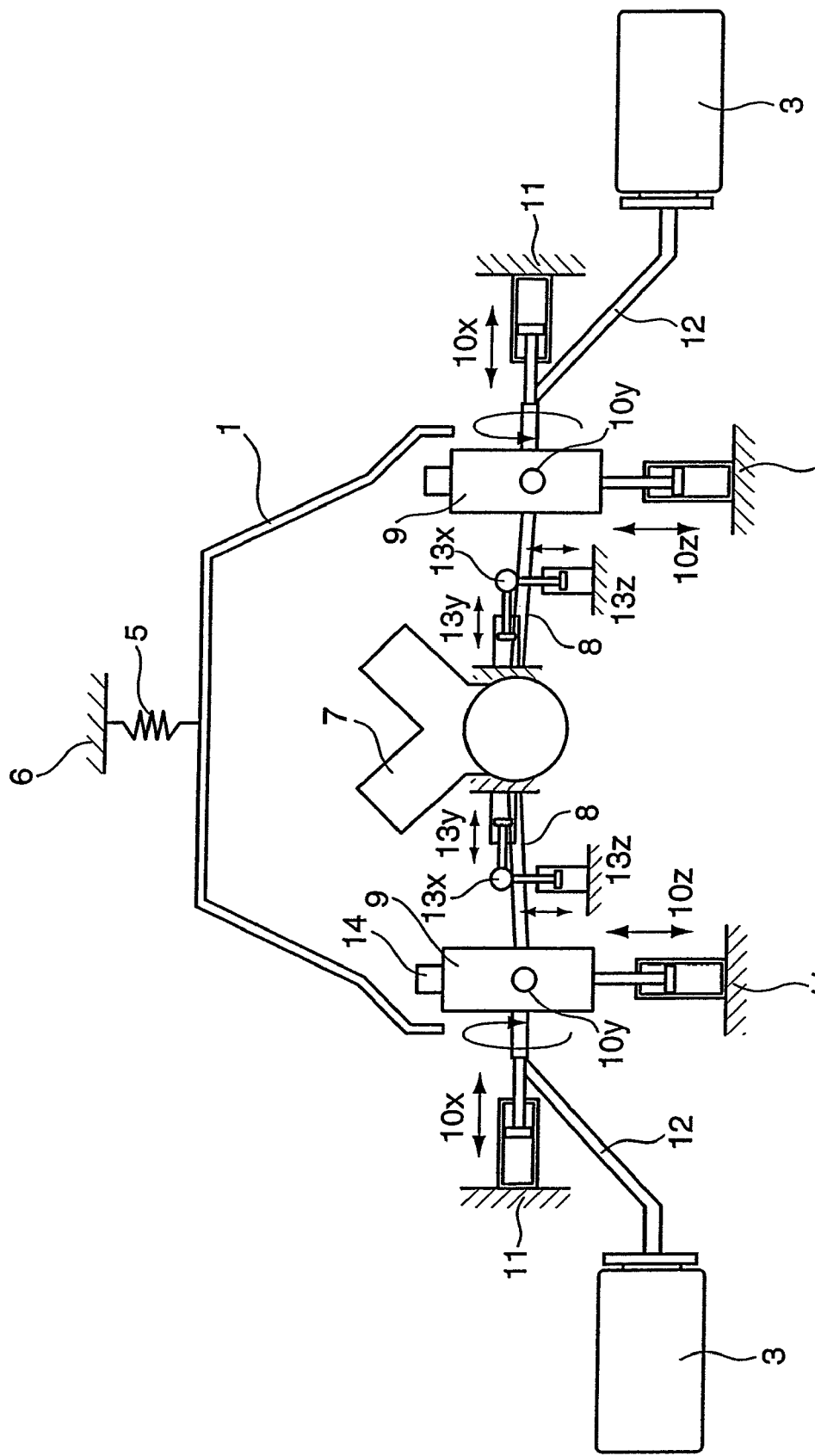
FIG. 1 is a schematic cross section through a test stand with a passenger car tied thereto and with parallel vibration generators.

FIG. 1 shows a schematic cross section through a test stand, to which a motor vehicle 1 is tied in a completely active fashion. The complete tie between the test stand and the motor vehicle 1 is indicated in the drawings in the form of the connection 5 with the counter bearing 6. The motor vehicle features its own engine 7 that is connected to a driving axle 8 in the embodiment shown, wherein both ends of the driving axle feature mounting devices 9 for the wheels of the motor vehicle 1. In the embodiment shown in FIG. 1, it is assumed that no wheels are mounted on the driving axle 8 in order to elucidate that a largely realistic simulation of a state of vibration of the motor vehicle does not require any contact between the wheels of the motor vehicle and a road surface in order to generate corresponding rolling noises within the motor vehicle.

Analogous to known test stands, both sides of the driving axle 8 are connected to load-absorbing motor drives 3 that are preferably realized in the form of electric motors.

In order to simulate driving maneuvers and different operational loads, the respective mounting devices 9 are directly or indirectly connected to servohydraulic load application units 10, by means of which the mounting devices 9 and therefore the entire motor vehicle 1 can be subjected to uniform three-dimensional excursions or vibrations with frequencies up to 50 Hz. In order to subject the motor vehicle to movements along all three axes in space, three servohydraulic load application units ($10_x$, $10_y$, $10_z$) are provided per mounting device 9, wherein the force flow directions of the load application units are respectively oriented orthogonal to one another. In the embodiment shown in FIG. 1, the servohydraulic load application units ($10_x$, $10_y$, $10_z$) are mounted on a mechanically stable counter bearing 11 with one side and on the mounting device 9 with the other side. The respective load-absorbing motors 3 are coupled to the mounting devices 9 by means of movable drive shafts 12 in order to ensure that the respective drive units 3 remain stationary and are not subjected to vibrations by the load application units 9.

A control unit, that is not illustrated in FIG. 1, is required in order to subject the entire motor vehicle 1 to excursions with the aid of the servohydraulic load application units ($10_x$, $10_y$, $10_z$) such that a simulated driving maneuver is executed, wherein the control unit coordinates the excursions of all servohydraulic load application units ($10_x$, $10_y$, $10_z$).

In addition to the servohydraulic load application units ($10_x$, $10_y$, $10_z$), high-frequency vibration generators ($13_x$, $13_y$, $13_z$) are provided parallel to their force flow directions, wherein the coupling points of the vibration generators respectively lie in the region of the car body or in the engine compartment of the passenger car or on the mounting devices 9 in the embodiment shown in FIG. 1.

The high-frequency vibration generators ($13_x$, $13_y$, $13_z$) are preferably realized in the form of electrodynamic shaker systems and make it possible to introduce vibrations with frequencies between 30 and 500 Hz. Analogous to the arrangement of the servohydraulic vibration generators 10, three separate electrodynamic shakers systems ($13_x$, $13_y$, $13_z$) are provided per coupling point, wherein the force flow directions of these shaker systems are respectively oriented orthogonal to one another. The excursions of the high-frequency vibration generators ($13_x$, $13_y$, $13_z$) are also controlled with the aid of a control unit (not illustrated) such that high-frequency vibrations can be introduced into the motor vehicle 1 in accordance with a predetermined vibration pattern.

Figure 2:
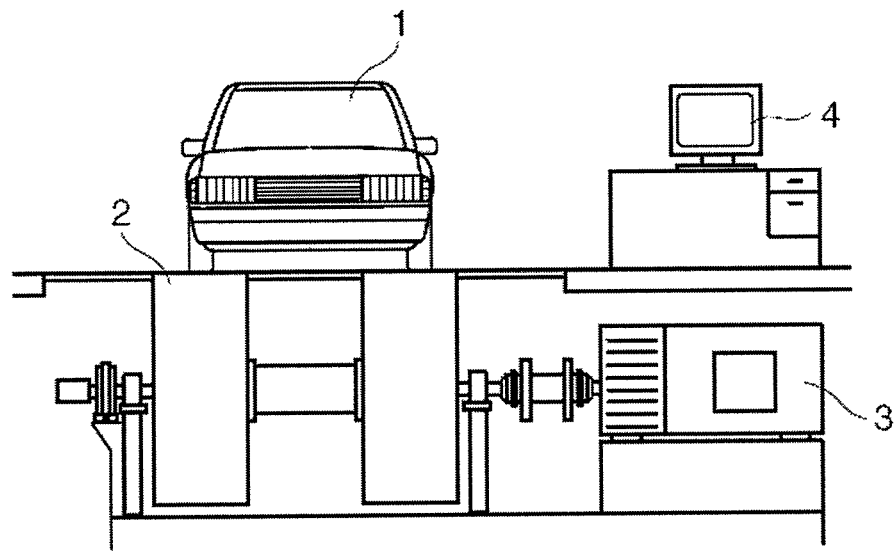
FIG. 2 is a classic roller-type test stand according to the state of the art.
Figure 3:
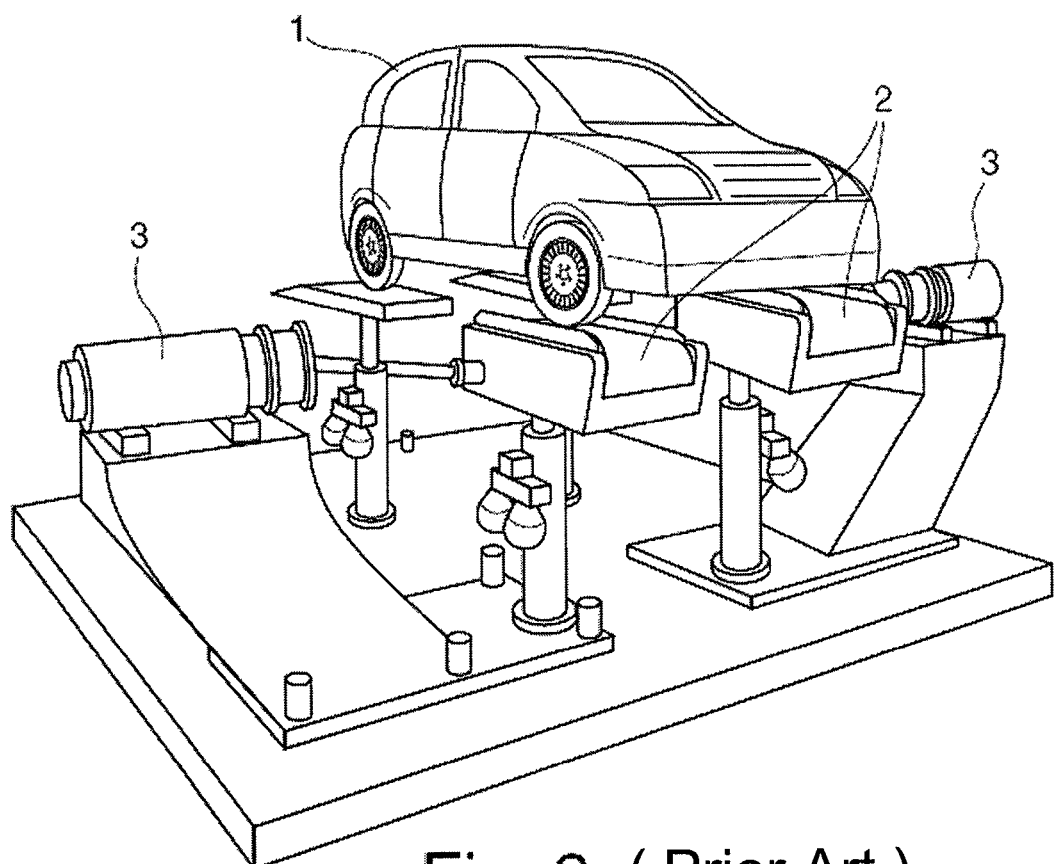
FIG. 3 is a known load test stand (state of the art)
Figure 4:
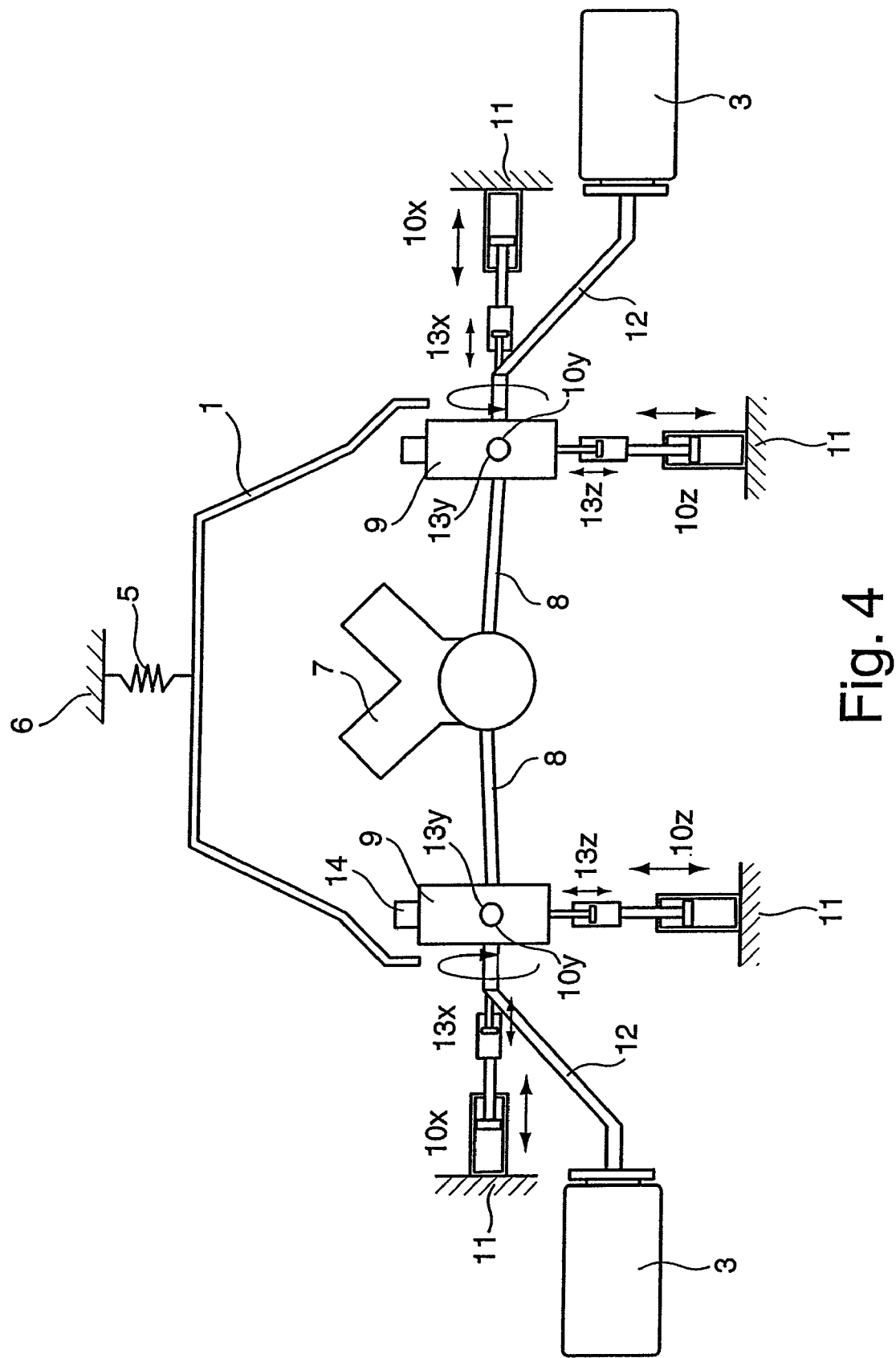
FIG. 4 is a schematic cross section through a test stand with a passenger car tied thereto and with vibration generators arranged in the uniform force flow.

FIG. 4 shows another embodiment for arranging the high-frequency vibration generators which can be used as an alternative to the above-described embodiment. With respect to FIGS. 2 and 3, reference is made to the introduction of the description. In this case, the motor vehicle 1 is also in a completely tied state referred to as a test stand. In addition, three servohydraulic load application units ($10_x$, $10_y$, $10_z$) are provided and arranged such that their force flow directions are respectively oriented orthogonal to one another, wherein the load application units are respectively connected to the mounting devices 9 of the motor vehicle 1. In the embodiment according to FIG. 4, however, the high-frequency electrodynamic vibration generators ($13_x$, $13_y$, $13_z$) are arranged along the force flow of the respective servohydraulic vibration generators ($10_x$, $10_y$, $10_z$) as illustrated, in particular, in the schematic representation according to FIG. 4. Since the high-frequency vibration generators ($13_x$, $13_y$, $13_z$) are not fixed on a mechanically stable counter bearing with one side in this case, but rather integrated into the respective force flows of the servohydraulic vibration generators 10 in the form of force-transmitting elements, vibration generators in which converter materials are used as vibration actuators are particularly suitable for this purpose. Vibration generators of this type that are provided with converter materials are known, for example, from DE 103 61 481 A1, but the modular interfaces described in this publication are used for damping mechanical vibrations. However, it is also possible to utilize the modular interfaces described in this publication for generating specific high-frequency vibrations if the energy conversion systems are controlled in a suitable fashion.

The basic principle for stimulating vibrations of the motor vehicle is largely identical to the two previously discussed embodiments according to FIGS. 1 and 4. The operational loads for simulating the driving maneuvers are introduced with a frequency between 0 and 50 Hz by means of the servohydraulic load application units 10. The high-frequency vibrations are introduced by means of the high-frequency vibration generators 13 that are stimulated in accordance with a predetermined vibration pattern. In order to achieve a largely realistic state of vibration of the motor vehicle, a reference sensor 14 is provided on the motor vehicle 1 and registers the actual state of vibration of the motor vehicle 1. This actual state of vibration is compared with a reference vibration pattern that was prepared during the course of a test drive as described in the introduction of the description. If the actual state of vibration deviates from a desired reference state of vibration, the vibration generators 10 and 13 are controlled in a correspondingly corrected fashion such that the vibrations match the predetermined reference vibration pattern.

According to an expanded version of the embodiment shown in FIGS. 1 and 4, in which a driving axle 8 is respectively connected to corresponding vibration generators, it is particularly advantageous to also couple the second axle with correspondingly vibration generators, namely regardless of the second axle consisting of another driving axle or a non-driven axle. In vehicles with four-wheel drive, in particular, it is basically unavoidable to provide all driving axles with vibration generators if a largely realistic state of vibrations should be induced within the motor vehicle.

LIST OF REFERENCE SYMBOLS

1 Motor vehicle
2 Roller
3 Electric motor
4 Control and monitoring unit
5 Connection
6 Counter bearing
7 Engine
8 Driving axle
9 Mounting device
10 Vibration generator of the first type, servohydraulic load application unit
11 Counter bearing
12 Flexibly arranged drive shaft
13 Vibration generator of the second type, electrodynamic shaker
14 Reference sensor

The invention claimed is:

1. An apparatus for carrying out a vibroacoustic inspection of a motor vehicle comprising:
a car body, a front axle and a rear axle a vehicle engine, a test stand to which the motor vehicle is tied and which is directly or indirectly connected to at least one of the front and rear axles by at least one force flow and at least one first vibration generator provided along the at least one force flow for generating vibrations below 50 Hz;
at least one drive shaft driven by the engine of the motor vehicle and two opposite driven shaft ends with no wheels mounted thereon and connected to at least one load absorbing motor; and at least one second vibration generator provided along the at least one force flow or parallel to the at least one force flow, operatively connected to the motor vehicle for generating vibrations above 50 Hz and includes at least one actuator of converter material for generating the vibrations above 50 Hz.

2. An apparatus according to claim 1 wherein:
the vibrations provided by the at least one second vibration generator range from above 50 Hz to 500 Hz.

3. An apparatus according to claim 1, wherein the at least one first vibration generator is a servohydraulic load application unit and the at least one second vibration generator is an electrodynamic load application unit.

4. An apparatus according to claim 3, wherein the electrodynamic load application unit comprises an electrodynamic shaker.

5. An apparatus according to claim 1, wherein the at least one first vibration generator is connected to a driving axle of the motor vehicle.

6. An apparatus according to claim 5, wherein
the load absorbing motor is an electric motor.

7. An apparatus according to claim 1, comprising:
at least one control unit for generating vibration signals in accordance with a predetermined vibration pattern which is connected to the at least one second vibration generator to cause the generation of the vibrations above 50 Hz.

8. An apparatus according to claim 7, comprising:
at least one vibration sensor provided on or in the motor vehicle wherein the at least one vibration sensor is connected to an evaluation unit and the at least one first and the at least one second vibration generator, the evaluation unit and the control unit are a control circuit for controlling the evaluation unit to provide a variance comparison between actual vibrations sensed by the at least one vibration sensor and vibrations defined by the predetermined vibration pattern to generate and transmit correction signals to the control unit to detect deviations.

9. An apparatus according to claim 1, comprising:
three first vibration generators disposed along the at least one force flow and respectively are connected to the at least one of the first and second axle in force flow directions that are oriented orthogonal to one another.

10. An apparatus according to claim 1, wherein:
three second vibration generators are arranged along or parallel to the at least one force flow and respectively are connected to the least one of the first and second axles in force flow directions that are oriented orthogonal to one another.

11. A method for carrying out a vibroacoustic inspection of a motor vehicle by an apparatus including a car body, a front axle and a rear axle, a vehicle engine, a test stand to which the motor vehicle is tied and which is directly or indirectly connected to at least one of the front and rear axles by at least one force flow and at least one first vibration generator provided along the at least one force flow for generating vibrations, at least one drive shaft which is driven by the engine and two opposite driven shaft ends with no wheels mounted thereon and connected to at least one load absorbing motor, and at least one second vibration generator connected to the motor vehicle for generating vibrations which includes at least one actuator including converter material for generating vibrations comprising:
vibrating the vehicle with the engine, driving the two opposite drive shafts, vibrating the vehicle with the at least one first vibration generator with frequencies ranging between 0 and 50 Hz for simulating driving conditions in accordance with a load pattern, and vibrating the motor vehicle with additional vibrations of a frequency higher than 50 Hz in accordance with a predetermined vibration pattern with the converter material.

12. A method according to claim 11, wherein the predetermined vibration pattern of a frequency higher than 50 Hz is produced during a real test drive of the motor vehicle.

13. A method according to claim 11, wherein the motor vehicle is subjected under control of the vibrations of frequency higher than 50 Hz.

14. A method according to claim 13, wherein the vibrations to which the motor vehicle is subjected are initiated by external stimulation using vibration generators and with the engine of the motor vehicle, and the initiated vibrations are sensed and compared with at least the vibration predetermined pattern higher than 50 Hz, and at least one actuator is controlled so that the vibrations of the motor vehicle match the predetermined vibration pattern of the higher frequency.

15. A method of use of the apparatus of claim 1 comprising:
simulating rolling noises in the motor vehicle without any interaction between a road surface and a tire profile.

16. A method of use according to claim 15, comprising:
providing vibroacoustic evaluations of different road surfaces and tire profiles.

17. An apparatus for carrying out a vibroacoustic inspection of a motor vehicle comprising:
a car body, a front axle and a rear axle a vehicle engine, a test stand to which the motor vehicle is tied and which is directly or indirectly connected to at least one of the front and rear axles by at least one force flow and at least one first vibration generator provided along the at least one force flow for generating vibrations in a first frequency range;
at least one drive shaft that is driven by the engine of the motor vehicle including two opposite driven shaft ends with no wheels mounted thereon and connected to at least one load absorbing motor; and
at least one second vibration generator provided along the at least one force flow or parallel to the at least one force flow, operatively connected to the motor vehicle for generating vibrations in a second frequency range above the first frequency range and includes at least one actuator of converter material for generating the vibrations in the second frequency range.

18. A method for carrying out a vibroacoustic inspection of a motor vehicle by an apparatus including a car body, a front axle and a rear axle, a vehicle engine, a test stand to which the motor vehicle is tied and which is directly or indirectly connected to at least one of the front and rear axles by at least one force flow and at least one first vibration generator provided along the at least one force flow for generating vibrations, at least one drive shaft which is driven by the engine and two opposite driven shaft ends with no wheels mounted thereon and is connected to at least one load absorbing motor, and at least one second vibration generator connected to the motor vehicle for generating vibrations which includes at least one actuator including converter material for generating vibrations comprising:
vibrating the vehicle with the engine, driving the two opposite drive shafts, vibrating the vehicle with the at least one first vibration generator with frequencies ranging in the first frequency range for simulating driving conditions in accordance with a load pattern, and vibrating the motor vehicle with additional vibrations in the second frequency range with the converter material.

* * * * *